United States Patent [19]
Geske et al.

[11] Patent Number: 6,145,819
[45] Date of Patent: Nov. 14, 2000

[54] DIE CYLINDER AND MANIFOLD AND SYSTEM

[75] Inventors: Jeffrey R. Geske, Lapeer; Boice F. Horde, Westland, both of Mich.

[73] Assignee: Forward Industries, LLC, Dearborn, Mich.

[21] Appl. No.: 09/081,382

[22] Filed: May 19, 1998

[51] Int. Cl.$^7$ ........................................... F16F 5/00
[52] U.S. Cl. ............................. 267/119; 267/130
[58] Field of Search .................................. 267/119, 118, 267/120, 124, 127, 130, 64.11, 64.15, 64.16, 64.18, 64.28

[56] References Cited

U.S. PATENT DOCUMENTS

| | | | |
|---|---|---|---|
| 3,580,558 | 5/1971 | Helrigel | 267/119 |
| 4,342,448 | 8/1982 | Wallis | 267/119 |
| 5,088,698 | 2/1992 | Wallis . | |
| 5,172,892 | 12/1992 | Wallis . | |
| 5,314,172 | 5/1994 | Wallis . | |
| 5,802,944 | 9/1998 | Bianchi et al. | 83/639.1 |

*Primary Examiner*—Michael Mar
*Assistant Examiner*—Pamela J. Lipka
*Attorney, Agent, or Firm*—Reising, Ethington, Barnes, Kisselle, Learman & McCulloch, PC

[57] ABSTRACT

A plurality of die cylinders adapted to contain gas under pressure are mounted on a manifold. Each cylinder comprising a cylinder body having an axially inner cylinder portion and an axially outer cylinder portion. A piston has an axially inner end portion extending into the inner cylinder portion and an axially outer end portion surrounded by the outer cylinder portion. A seal is provided between the inner end portion of the piston and the inner cylinder portion. There is a removable sealing cartridge between the outer end portion of the piston and the outer cylinder portion. A snap ring removably retains the cartridge on a shoulder between the inner and outer cylinder portions. The piston is capable of full axially outward retraction and separation from the cylinder when the cartridge is removed. The cylinder is free of any obstruction which would interfere with the axially outward retraction and separation of the piston when the cartridge is removed. The cylinder body has a pilot portion engaging a complimentary cylindrical opening in the manifold so that the inner end of the cylinder body communicates with high pressure gas within the manifold.

6 Claims, 2 Drawing Sheets

DIE CYLINDER AND MANIFOLD AND SYSTEM

This invention relates generally to die cylinders and more particularly to high pressure die cylinders in manifold systems.

BACKGROUND AND SUMMARY OF THE INVENTION

In die cylinders, whether of the stand-alone type or those in manifold systems, it is necessary from time to time to repair and/or replace the piston seal. This has required a complete dismantling of the die cylinder in order to gain access to the piston seal. What is needed is a cylinder and piston construction in which the piston can be easily and quickly removed from the cylinder when and if repair or replacement of the piston seal is required.

In accordance with the present invention, a removable sealing cartridge is provided between the piston and the cylinder. The piston is capable of being separated from the cylinder when the cartridge is removed. The cylinder is free of any obstructions which would interfere with withdrawal and the separation of the piston.

More specifically, the piston seal is on an inner end portion of the piston. A removable sealing cartridge is provided between an outer end portion of the piston and an outer cylinder portion. The piston is capable of full axially outward retraction and separation from the cylinder when the cartridge is removed. Preferably the sealing cartridge is seated on a shoulder between inner and outer cylinder portions and is removably retained on the shoulder by a snap ring. The piston is so dimensioned that it may be easily withdrawn axially outwardly from the cylinder.

Preferably the cartridge comprises a first support ring seated on the shoulder and a second support ring seated on the first support ring. Sealing means are provided to seal against one of the support rings and against the outer end portion of the piston. Additional sealing means seals against the outer cylinder portion. Preferably the sealing means which seals against one of the support rings and against the outer end portion of the piston comprises first and second sealing rings which seal against the outer end portion of the piston and against the second support ring, with a ring separator between the first and second sealing rings.

One object of this invention is to provide a die cylinder, either of the stand-alone type or in a manifold system, which has the foregoing features and capabilities.

Another object is to provide a die cylinder including a sealing cartridge which is composed of a relatively few simple parts, is rugged and durable in use, is capable of being inexpensively manufactured, and can be easily and quickly assembled and disassembled.

These and other objects, features and advantages of the invention will become more apparent as the following description proceeds, especially when considered with the accompanying drawings.

DETAILED DESCRIPTION OF THE PREFERRED EMBODIMENT

Figure 1:
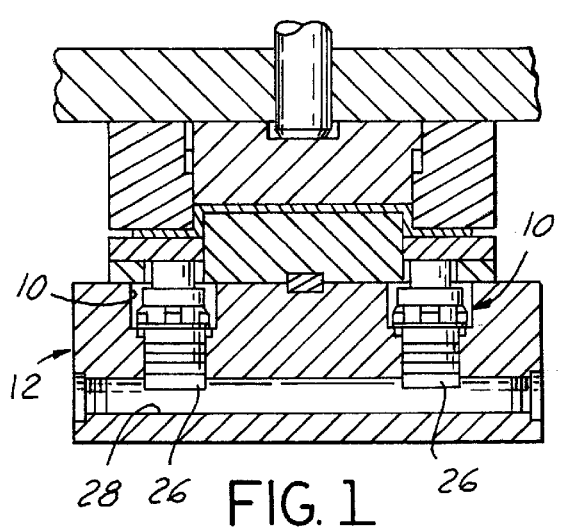
FIG. 1 is a sectional view of a high pressure die cylinder and manifold system embodying the invention.
Figure 3:
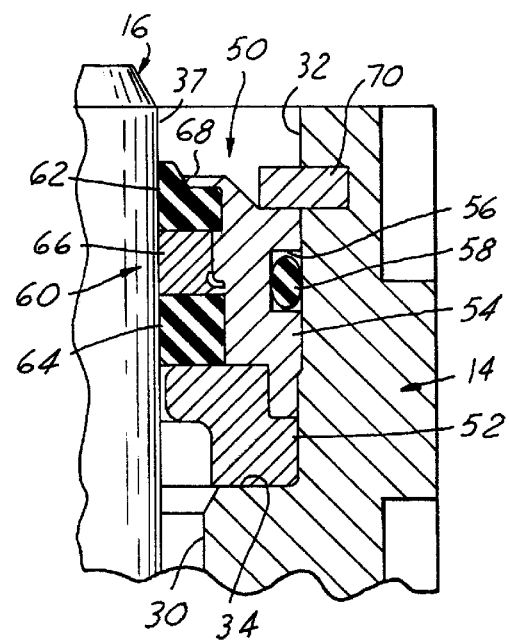
FIG. 3 is a an enlarged fragmentary sectional view of that portion of FIG. 2 shown within the oval.
Figure 2:
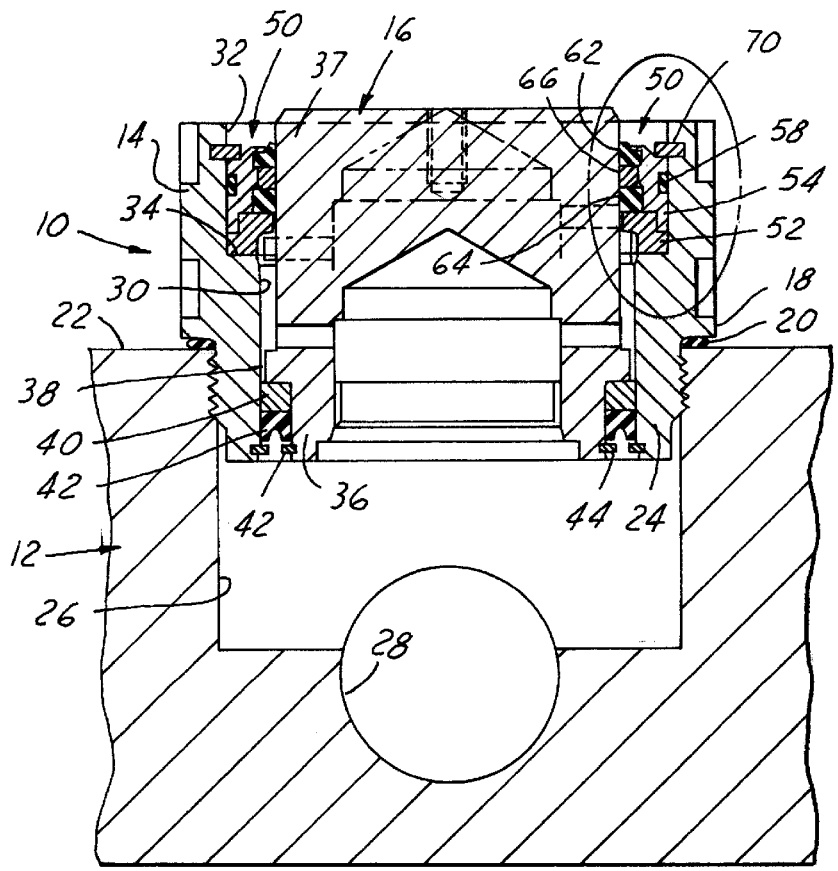
FIG. 2 is a vertical sectional view of a die cylinder employed in the manifold system.
Figure 4:
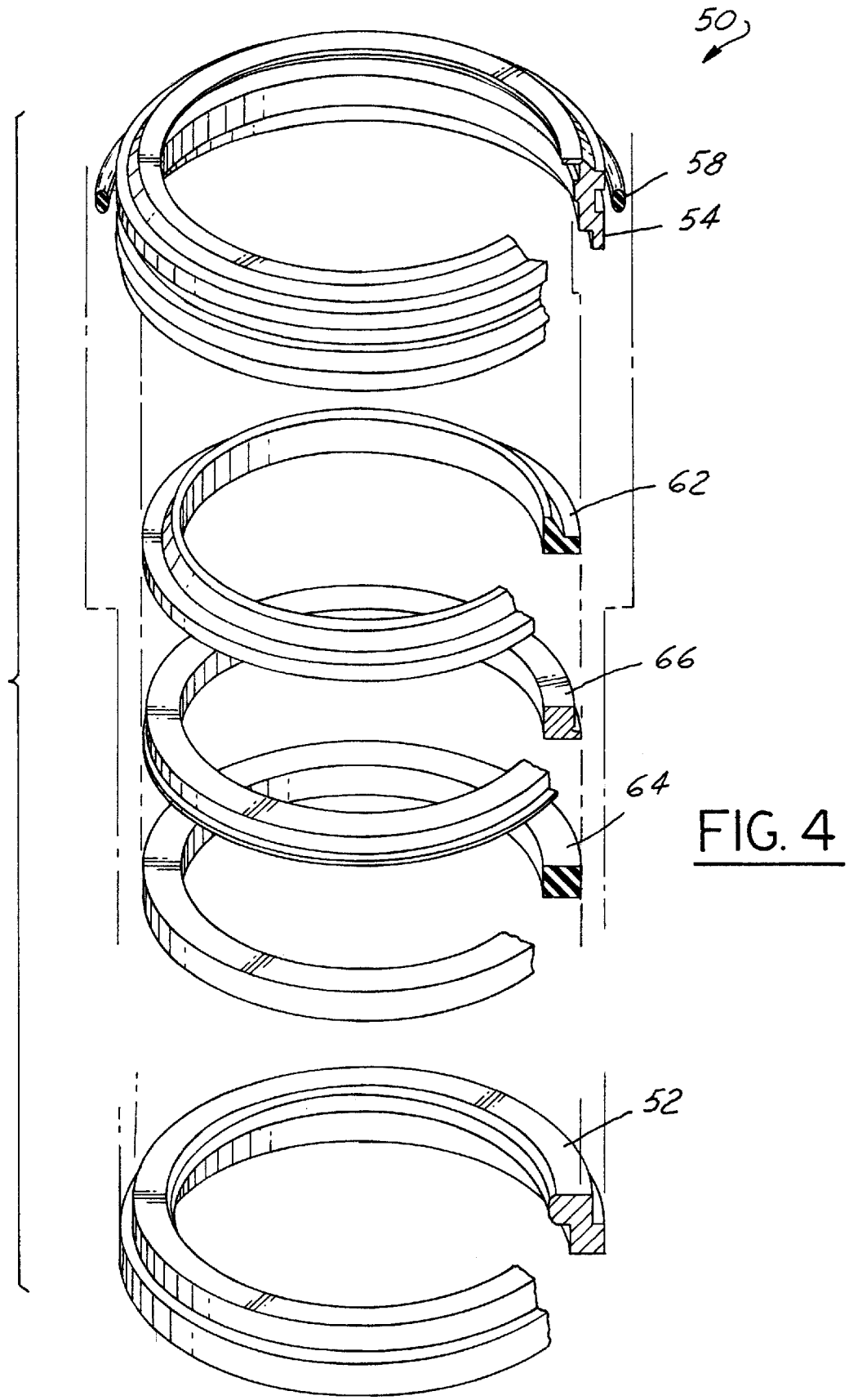
FIG. 4 is an enlarged exploded view, with parts broken away and in section, of the sealing cartridge between the piston and the cylinder.

Referring now more particularly to the drawings and especially to FIGS. 1 and 2, the high pressure die cylinder and manifold system of this invention comprises a plurality of die cylinders 10 mounted on a manifold 12.

Each die cylinder 10 comprises a cylinder body 14 in which a piston 16 is positioned for limited axially movement. The cylinder body 14 is provided with a radially outwardly extending annular flange 18. An annular O-ring seal 20 of rubber or other suitable sealing material is placed between the flange 18 and a horizontal surface 22 of the manifold 12. The cylinder body 14 has a cylindrical lower end portion 24 which extends into a cylindrical opening 26 in the manifold and is threadedly engaged therewith. The die cylinders 10 communicate with one another through the openings 26 and the cross-passage 28 in the manifold.

The cylinder body 14 has an inner cylinder portion 30 and an outer cylinder portion 32. The cylinder portions 30 and 32 are each of uniform circular cross-section throughout their length, with the outer cylinder portion 32 being of larger diameter than the inner cylinder portion 30 and separated therefrom by an annular shoulder 34.

The piston has an inner end portion 36 and an outer end portion 37. The inner end portion 36 is formed with a radially, outwardly extending flange 38 spaced from the inner extremity of the piston. A metal sealing support ring 40 encircles the inner end portion of the piston in engagement with the flange 38. A cup-shaped ring seal 42 of rubber or a suitable sealing material surrounds the inner end portion of the piston beneath the sealing support ring 40. A snap ring 44 beneath the ring seal 42 engages a groove in the inner end portion of the piston and supports the ring seal between the snap ring and the flange 38. The ring seal 42 seals the space between the inner end portion 36 of the piston and the inner cylinder portion 30. A snap ring 44 at the lower end of the inner cylinder portion 30 is engageable with the ring seal 42 to limit further inward movement of the piston.

A sealing cartridge 50 seals the space between the outer cylinder portion 32 and the outer piston portion 37. The sealing cartridge 50 comprises first and second metal rings 52 and 54. The ring 52 is Z-shaped in cross section and is seated on the shoulder 34. The ring 54 is seated on the ring 52 and has a radially outwardly opening groove 56 receiving an O-ring 58 of rubber or other suitable sealing material which seals against the base of the recess and against the outer cylinder portion 32. Sealing means 60 are provided to seal against the outer piston portion 37. The sealing means 60 includes an outer ring seal 62 and inner ring seal 64 both of rubber or other suitable sealing material. Between the ring seals 62 and 64 is a metal sealing ring separator 66. The inner ring seal 64 is seated on the metal ring 52 and seals against the metal ring 52 as well as the outer end portion 37 of the piston, the metal ring 54 and the ring separator 66. The outer ring seal 62 seals against the outer end portion 37 of the piston, the metal ring 54, the ring separator 66. A radially inwardly extending flange 68 on the outer end of the metal ring 54 overlies and confines the outer ring seal 62. A removable snap ring 70 in a groove in the outer cylinder portion near the outer extremity of the cylinder overlies the metal ring 54 and serves to removably retain the sealing cartridge 50 on the shoulder 34 of the cylinder.

When it is desired to replace and/or repair the seal 42 of the piston 16, the piston can be removed axially outwardly from the cylinder by first a removing the sealing cartridge 50. The sealing cartridge is easily removed once the snap ring 70 is removed. The flange 38 on the piston is the largest diameter portion of the piston and this flange is smaller in diameter than the inner and outer cylinder portions 30 and 32 so that the piston may be easily, axially outwardly retracted and separated from the cylinder once the cartridge 50 is removed. The cylinder is free of any obstructions which would interfere with this axially outward retraction and separation of the piston when the cartridge is removed.

What is claimed is:

1. A die cylinder and manifold system comprising a plurality of die cylinders adapted to contain gas under pressure and mounted on a manifold, each of said die cylinders comprising a cylinder body having an axially inner cylinder portion and an axially outer cylinder portion, a shoulder between said inner and outer cylinder portions, a piston having an axially inner end portion extending into said inner cylinder portion and an axially outer end portion surrounded by said outer cylinder portion, a seal between the inner end portion of the piston and the inner cylinder portion, a removable sealing cartridge between said outer end portion of said piston and said outer cylinder portion, said removable sealing cartridge comprising a first support ring seated on said shoulder, a second support ring seated on said first support ring, first sealing means sealing against one of said support rings and against the outer end portion of said piston, and second sealing means sealing against said one of said support rings and against said outer cylinder portion, a snap ring removably retaining said cartridge on said shoulder, said piston being capable of full axially outward retraction and separation from said cylinder when said cartridge is removed, said cylinder being free of any obstructions which would interfere with said axially outward retraction and separation of said piston when said cartridge is removed, said cylinder body having an inner pilot portion engaging a complimentary cylindrical opening in the manifold so that the inner end of the cylinder body communicates with high pressure gas within the manifold, and a manifold sealing ring between the manifold opening and the pilot portion on the cylinder body, said first sealing means comprising first and second sealing rings sealing against the outer end portion of said piston and against said second support ring, and a ring separator between said first and second sealing rings.

2. A die cylinder and manifold system as in claim 1, wherein said second sealing means comprise a sealing ring sealing against said second support ring and against said outer cylinder portion.

3. A die cylinder and manifold system as in claim 2, wherein the maximum diameter of said inner and outer cylinder portions is greater than the maximum diameter of said piston.

4. A die cylinder comprising, a cylinder adapted to contain gas under pressure, said cylinder having an axially inner cylinder portion and an axially outer cylinder portion of larger diameter than said inner cylinder portion, a shoulder between said inner and outer portions, a piston having an axially inner end portion extending into said inner cylinder portion and an axially outer end portion surrounded by said outer cylinder portion, a seal between the inner end portion of the piston and the inner cylinder portion, a removable sealing cartridge seated on said shoulder between said outer end portion of said piston and said outer cylinder portion, said removable sealing cartridge comprising a first support ring seated on said shoulder, a second support ring seated on said first support ring, first sealing means sealing against one of said support rings and against the outer end portion of said piston, second sealing means sealing against said one of said support rings and against said outer cylinder portion, and a snap ring removably retaining said cartridge on said shoulder, said piston being capable of full axially outward retraction and separation from said cylinder when said cartridge is removed, said cylinder being free of any obstructions which would interfere with said axially outward retraction and separation of said piston when said cartridge is removed, said first sealing means comprising first and second sealing rings sealing against the outer end portions of said piston and against said second support ring, and a ring separator between said first and second sealing rings.

5. A cylinder as in claim 4, wherein said second sealing means comprises a sealing ring sealing against said second support ring and against said outer cylinder portion.

6. A die cylinder as in claim 5, wherein said inner end portion of said piston is of no greater diameter than said outer end portion thereof.

* * * * *